United States Patent [19]

Donegan et al.

[11] Patent Number: 4,709,021

[45] Date of Patent: Nov. 24, 1987

[54] COPPER PHTHALOCYANINE PIGMENTS

[75] Inventors: Thomas E. Donegan, Holland; Timothy G. Leary, Grand Haven, both of Mich.

[73] Assignee: BASF Corporation, Parsippany, N.J.

[21] Appl. No.: 795,487

[22] Filed: Nov. 6, 1985

[51] Int. Cl.⁴ .............................................. C09B 47/04
[52] U.S. Cl. ...................................... 540/141; 106/20; 106/288 Q
[58] Field of Search .............. 540/141; 106/20, 288 Q

[56] References Cited

U.S. PATENT DOCUMENTS 4,439,238  3/1984  Pigasse ............................ 540/141 X Primary Examiner—Richard L. Raymond
Attorney, Agent, or Firm—Rupert B. Hurley, Jr.; Joseph D. Michaels

[57] ABSTRACT

A process for preparing phthalocyanine pigment which exhibits excellent flow characteristics when dispersed in solvent type inks comprising the steps of I. mixing in a high shear mixer
 (a) premilled copper phthalocyanine crude pigment,
 (b) tri-(diethylamino-methylene) copper phthalocyanine or an organic salt thereof, and
 (c) a phase director and II. digesting the mixture in water or an aqueous mineral acid solution.

14 Claims, No Drawings

COPPER PHTHALOCYANINE PIGMENTS

BACKGROUND OF THE INVENTION

The present invention relates to a process for preparing phthalocyanine pigments with improved dispersion characteristics. More specifically, it relates to preparing dry pigment compositions in the absence of an inorganic salt grinding step.

The introduction of phthalocyanine pigments in 1935 set new standards of excellence in the pigments consuming industries. They are characterized by their excellent light fastness, intensity, bleed and chemical resistance, extreme stability and exceptionally high tinting strength. phthalocyanine pigments are restricted to the blue and green regions of the spectrum. Because of their excellent color values, working properties and low cost in addition to durability, the phthalocyanine blue and green pigments are used extensively.

The two processes most generally employed for producing copper phthalocyanine pigments are (1) heating phthalic anhydride, urea, a copper salt and a catalyst with or without a reaction medium such as chloronaphthalene or trichlorobenzene to 180° to 200° C. and (2) heating phthalonitrile and a copper salt with or without a reaction medium or solid diluent. The product that results is generally a copper phthalocyanine blue pigment of about 65 to 70 percent purity.

The product produced by these processes is a crude phthalocyanine pigment. As used herein, the term "crude pigment" defines a colorant that has a much larger particle size than does its pigment grade; for example, the particle size of the crude grade of phthalocyanine is generally about 40 to 50 microns or larger whereas the particle size of its pigmentary grade is generally about 0.01 to 1 micron.

There are many known methods for conditioning crude pigments, such as dry grinding the crude phthalocyanine in the presence of an inorganic salt grinding aid such as an alkali metal halide, carbonate, sulfate or phosphate.

In the preparation of inks, paints, colored plastics, and the like, it is essential that the pigment be uniformly dispersed in the vehicle. There are many techniques for improving dispersibility of pigments such as adding the pigment in the form of a fine powder. However, solvent type inks such as nitrocellulose present a particularly difficult problem due to the high viscosity of the base ink. Poor viscosity hinders dispersion and the ultimate color characteristics of the finished inks. Accordingly, it is the purpose of the instant invention to prepare a phthalocyanine pigment, and particularly phthalocyanine blue pigment, which exhibits excellent flow in solvent type inks, particularly nitrocellulose.

| Patents of Interest | | | | |
|---|---|---|---|---|
| Country | Patent No. | Issued | Inventor(s) | Assignee |
| British | 2,042,576 | 9/24/80 | | BASF |
| U.S. | 3,598,625 | 8/10/71 | Buckwalter et al | Cities Service |
| U.S. | 4,371,643 | 2/1/83 | Thomas | Cyanamid |
| U.S. | 4,448,607 | 5/15/84 | Johnson et al | Sun Chemical |

British No. 2,042,576—teaches the premilling process employed as step IA of this invention as set forth below.

U.S. Pat. No. 3,598,625—discloses preconditioning a phthalocyanine blue crude pigment in a ball mill followed by salt grinding in the presence of an organic liquid which organic liquid may be glycol or glycol ethers. Ethyléne glycol and diethylene glycol are specifically mentioned.

U.S. Pat. No. 4,448,607—discloses milling crude phthalocyanine with a phthalimidomethyl phthalocyanine derivative and in the absence of any milling or grinding aid such as salt.

U.S. Pat. No. 4,371,643—discloses dry grinding copper phthalocyanine pigments in the presence of hydroxylic solvents such as water, ethylene glycol, monobutylethers of ethylene glycol and a polar polymer and, in the absence of salt.

SUMMARY OF THE INVENTION

I. Mix in a high shear mixer (e.g., dough mixer).
   A. Copper phthalocyanine which has been premilled in accordance with the teachings of British Pat. No. 2,042,576.
   B. Tri-(diethylamino-methylene) copper phthalocyanine or organic salts thereof.
   C. A phase director.
II. Digest in water or aqueous mineral acid solution.

As used throughout the instant specification and claims, the expression "premilled" means phthalocyanine which has been premilled in accordance with the teachings of British Pat. No. 2,042,576.

DETAILED DESCRIPTION OF THE INVENTION

Copper phthalocyanine is converted from its crude state to its pigmentary form by premilling in accordance with the teachings of British Pat. No. 2,042,576 which is incorporated herein by reference. More specifically, in this premilling step the crude pigment is comminuted in the preaence of from 0.5 to 15 percent by weight, based on crude pigment of one or more acids which have a pK of <4.9 and are non-oxiding under the milling conditions and in the absence of milling assistants.

The milled material in the process according to the invention is obtained by comminuting the coarsely crystalline or agglomerated crude pigment, e.g., as obtained from the process of synthesis, in the presence of one or more acids of the stated type. The comminution can take place in conventional milling equipment suitable for dry comminution, especially in ball mills, vibratory mills or edge mills. Balls, especially those made from steel or a ceramic, are a suitable grinding medium.

The milling process may be carried out at from 0° to 140° C., as a rule at from room temperature (20° C.) to 90° C.

The milling time depends on the crude piqment and is suitably from 10 to 50 hours, in most cases from 20 to 30 hours. The milled material obtained usually consists of agglomerates of size from 0.5 to 150 μm, which are in general composed of primary particles of size 0.1 μm or less, preferably of primary particles of size from 0.01 to 0.05 μm.

The non-oxidizing acids used in the milling operation have a pK of <4.9, preferably <2.5. Specific examples are: 85 to 100 percent strength by weight sulfuric acid, 85 to 100 percent strength by weight phosphoric acid, $C_1$–$C_{20}$ alkane-sulfonic acids, alk-1-ene-1-sulfonic acids and 2-hydroxy-alkane-1-sulfonic acids of 8 to 20 carbon atoms in the alkene or alkane radical respectively, sulfuric acid half-esters of $C_1$–$C_{20}$ alkanols, benzensulfonic acid and naphthalenesulfonic acids, in which the benezene and naphthalene radical may be substituted by 1 or 2 $C_1$-$C_{20}$ alkyl and/or one hydroxyl, alkanoic acids of 1 to 5 carbon atoms, monochloroacetic acid, dichloroacetic acid and trichloroacetic acid, trifluoroacetic acid, maleic acid, dihydroxymaleic acid, tartaric acid, dihydroxytartaric acid and mixtures of these acids.

The amount of such non-oxidizing acids is from 0.5 to 15, preferably from 1 to 10 percent by weight based on crude pigment. A particularly advantageous pigment is obtained on finishing by using a milled material which is obtained by milling in the presence of from 2 to 7 percent by weight, based on crude pigment, of such a non-oxiding acid.

For economic reasons, preferred non-oxidiing acids of this type are 85 to 100 percent strength by weight sulfuric acid, 85 to 100 percent strength phosphoric acid, formic acid, glacial acetic acid, trichloroacetic acid, methanesulfonic acid, benzenesulfonic acid, the toluenesulfonic acids, the naphthalenesulfonic acids, propionic acid or mixtures of these.

The premilled copper phthalocyanine crude is then mixed with tri-(diethylamino-methylene) copper phthalocyanine or an organic salt thereof and a phase director such as diethylene glycol in a high shear mixer such as a dough mixer. Mixing time may range from one to five hours and no heat is required. However the mixing operation tends to result in a liberation of heat thereby raising the temperature of the mixture. It is preferred that the temperature should not exceed 120° C. Under normal conditions it is not necessary to employ any special means to keep the temperature below this level. Hereinafter, for the sake of brevity, the tri-(diethylamino-methylene) copper phthalocyanine will be referred to as TDAM-CPC. As previously stated, TDAM-CPC or an organic salt thereof such as tri-(diethylamino-methylene)copper phthalocyanine dodecylbenzene sulfonic acid may be employed. The preferred phase director is diethylene glycol. However, ethylene glycol, propylene glycol, di- and tripropylene glycol, ethyl alcohol, aniline, dimethylformamide, glycol ethers, such as butyl cellosolve, and phenyl glycol ether, methyl pyrrolidone, triethanolamine and other phase directors known to those skilled in the art may be employed.

The amount of TDAM-CPC may range from about 0.5 to 1.5 percent by weight of the premilled copper phthalocyanine. The amount of the phase director may range from about 20 to 100 percent by weight of the premilled copper phthalocyanine.

The mass is allowed to generate heat rising from ambient to 120° C. and is mixed for a total time of from about one to five hours. The mixture forms a heavy paste which is then added to or digested in either water or an aqueous solution of a mineral acid. The temperature of the water or acid solution is from about 50° to 100° C. and the digestion takes place from about 0.5 to five hours. Preferred mineral acids, where employed, are HCl and $H_2SO_4$ and the amount of mineral acid in the water is sufficient to give a pH of 1.0 to 2.0. The product is then filtered, washed, dried and pulverized to produce the ultimate pigment product.

A flocculation resistant substance may be added to the pigment slurry prior to filtration to promote flocculation resistance. The amount of this substance may range from about 5 to 15 percent based on the amount of final product produced. For use in nitrocellulose type inks, the flocculation resistant substance is essential. The flocculation resistant substance may be added to the water or aqueous mineral acid solution prior to the digestion step. The preferred flocculation resistant substance is monosulfonated copper phthalocyanine. Actually any substance which could impart flocculation resistance such as chlorosulfonated copper phthalocyanine and copper bis- and trisisopropylaminomethyl phthalocyanine and other tris- derivatives may be employed. Surfactants may also be added to the pigment slurry prior to filtration, in amount of about 4 to 10 percent of the amount of final product, to enhance various color properties. Suitable surfactants include quaternary ammonium salts such as dicocodimethyl ammonium chloride, di- and trimethylbenzyl ammonium chloride, octadecyl diethanol methyl ammonium chloride, and other quaternary salts. Quaternary ammonium salts are required where the resulting product is used in nitrocellulose inks. These products, when compared to similar products produced by a different process, result in such inks having greatly improved viscosity.

The instant invention will be further described in the following examples. Unless otherwise indicated, all parts and percentages are by weight and all temperatures are in degrees centigrade.

EXAMPLE 1

Copper phthalocyanine blue premilled in accordance with British Pat. No. 2,042,576 is added in amount of 800 grams to a 0.75 gallon dough mixer sold by the Baker-Perkins Company with the model designation 4-AN-2. Two hundred grams of diethylene glycol and 10 grams of TDAM-CPC are also added to the mixer and mixing begun. The mass generates heat raising the temperature from ambient to about 107° C. at which temperature the product is mixed for three hours adding additional diethylene glycol as necessary to maintain consistency. One hundred fifty grams of the above mass is then discharged into 4 liters of water containing 16.6 grams of monosulfonated copper phthalocyanine. 8.2 grams of a quaternary ammonium salt sold under the trade name Arquad 2C-75 which is dicocodimethyl ammnoium chloride is added to enhance gloss. The slurry is then heated at 90° C. for two hours, filtered, washed, dried, and pulverized in a hammer mill. Electro micrographs show the particles to be isometric. The nitrocellulose ink prepared using the above product has an initial viscosity of 170 cps. Similar products but having acicular particles produced by prior art processes generally have viscosities around 1600 cps.

EXAMPLE 2

Example 1 is repeated with the exception that an alkylarylsulfonate salt of the TDAM-CPC having 12 carbon atoms in the alkyl group is employed in lieu of the TDAM-CPC of Example 1. Nitrocellulose inks prepared using this product are characterized by low viscosity.

EXAMPLE 3

The process of Example 1 is repeated with the exception that propylene glycol is employed in lieu of diethylene glycol. Nitrocellulose inks prepared using this product are characterized by low viscosity.

EXAMPLE 4

The process of Example 1 is repeated with the exception that the digestion step employs aqueous HCl solution having a pH of about 1.5 in lieu of plain water.

Nitrocellulose inks prepared using this product are characterized by low viscosity.

EXAMPLE 5

The process of claim 1 is repeated with the exception that chlorosulfonated copper phthalocyanine is employed in lieu of the monosulfonated phthalocyanine. Nitrocellulose inks prepared using this product are characterized by low viscosity.

EXAMPLE 6

Copper phthalocyanine blue premilled in accordance with British Pat. No. 2,042,576 is added in amount of 800 grams to a 0.75 gallon dough mixer sold by the Baker-Perkins Company with the model designation 4-AN-2. Two hundred grams of diethylene glycol and 10 grams of TDAM-CPC are also added to the mixer and mixing begun. The mass generares heat raising the temperature from ambient to about 107° C. at which temperature the product is mixed for three hours adding additional diethylene glycol as necessary to maintain consistency. One hundred fifty grams of the above mass is then discharged into 3 liters of water at 90° C. The slurry is then heated at 90° C. for two hours, filtered, washed, dried, and pulverized in a hammer mill. Electro micrographs show the particles to be isometric. A publication gravure type ink prepared using the above product has an initial viscosity of 475 cps. Similar products but having acicular particles produced by prior art processes generally have viscosities around 1200 cps.

What is claimed is:

1. A process for preparing a digested phthalocyanine crude comprising the steps of:
   I. mixing in a high shear mixer, while allowing the mass to generate heat so that the temperature achieved is between ambient and 120° C.,
      (a) premilled copper phthalocyanine crude pigment,
      (b) between 0.5 percent and 1.5 percent, based on weight of premilled copper phthalocyanine, of a tri-(diethylamino-methylene) copper phthalocyanine or an organic salt thereof, and
      (c) between 20 percent and 100 percent, based on weight of premilled copper phthalocyanine, of a phase director and
   II. digesting the mixture in water or an aqueous mineral acid solution, at a temperature between about 50° C. and 100° C.

2. The process of claim 1 wherein the digested product is filtered, washed, dried, and pulverized.

3. The process of claim 1 wherein a flocculation resistant substance is incorporated in said mixture.

4. The process of claim 3 wherein a surfactant is also incorporated in said mixture.

5. The process of claim 4 wherein said digested product is filtered, washed, dried, and pulverized in a hammer mill.

6. The process of claim 1 wherein said phase director is diethylene glycol.

7. The process of claim 1 wherein said mixture is digested in water.

8. The process of claim 1 wherein said mixture is digested in an aqueous HCl solution having a pH of about 1 to 2.

9. The process of claim 1 wherein said mixing step is performed for about one to five hours at a temperature ranging from ambient to about 120° C. and said digestion temperature is about 50° to 100° C. for about 0.5 to five hours.

10. The process of claim 9 wherein the amount of said tri-(diethylamino-methylene) copper phthalocyanine compound is from about 0.5 to 1.5 percent of the premilled copper phthalocyanine and the amount of said phase director is from about 20 to 100 percent of said copper phthalocyanine and the amount of said mixture is about 0.1 percent to 30 percent of the digestion liquid.

11. The process of claim 9 wherein a floccuation resistant substance and a quaternary ammonium salt are incorporated in said mixture during said digestion step.

12. The process of claim 11 wherein the amount of said tri-(diethylamino-methylene) copper phthalocyanine compound is from about 0.5 to 1.5 percent of the premilled copper phthalocyanine, the amount of said phase director is from about 20 to 100 percent of said copper phthalocyanine and the amount of said mixture is about 0.1 to 30 percent of the digestion liquid, the amount of flocculation resistant substance is about 5 to 15 percent and the amount of quarternary ammonium salt is about 4.0 to 10.0 percent of the final product.

13. The process of claim 12 wherein said flocculation resistant substance is monosulfonated copper phthalocyanine.

14. The process of claim 13 wherein said quaternary ammonium salt is dicoco dimethyl ammonium chloride.

* * * * *